United States Patent
Kodama et al.

(10) Patent No.: US 10,249,911 B2
(45) Date of Patent: Apr. 2, 2019

(54) SOLID-STATE LITHIUM BATTERY

(71) Applicant: TOYOTA JIDOSHA KABUSHIKI KAISHA, Toyota-shi, Aichi-ken (JP)

(72) Inventors: Masashi Kodama, Hadano (JP); Satoshi Wakasugi, Owariasahi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 92 days.

(21) Appl. No.: 15/378,572

(22) Filed: Dec. 14, 2016

(65) Prior Publication Data
US 2017/0179545 A1 Jun. 22, 2017

(30) Foreign Application Priority Data
Dec. 18, 2015 (JP) .................... 2015-247507

(51) Int. Cl.
*H01M 10/42* (2006.01)
*H01M 4/505* (2010.01)
(Continued)

(52) U.S. Cl.
CPC ........ *H01M 10/4235* (2013.01); *H01M 4/505* (2013.01); *H01M 4/525* (2013.01);
(Continued)

(58) Field of Classification Search
CPC ......... H01M 10/4235; H01M 10/0567; H01M 10/056; H01M 4/628; H01M 4/505;
(Continued)

(56) References Cited

U.S. PATENT DOCUMENTS

| 2012/0049126 A1* | 3/2012 | Park | C04B 35/447 |
| | | | 252/506 |
| 2013/0266847 A1 | 10/2013 | Noguchi et al. | |
| 2015/0140444 A1* | 5/2015 | Dubois | H01M 4/505 |
| | | | 429/331 |
| 2015/0207177 A1 | 7/2015 | Ose et al. | |

FOREIGN PATENT DOCUMENTS

| CN | 104471779 A | 3/2015 |
| CN | 104704657 A | 6/2015 |

(Continued)

OTHER PUBLICATIONS

Zhang, et al., "A review on electrolyte additives for lithium-ion batteries," Journal of Power Sources; vol. 162 (2), Nov. 22, 2006, pp. 1379-1394.

(Continued)

*Primary Examiner* — Gary D Harris
(74) *Attorney, Agent, or Firm* — Oliff PLC

(57) ABSTRACT

A solid-state lithium battery in which a thermal stability is improved. The solid-state lithium battery comprises a cathode active material layer containing a cathode active material, an anode active material layer containing an anode active material, and a solid electrolyte layer formed between the cathode active material layer and the anode active material layer. The cathode active material is an oxide active material, at least one of the cathode active material layer and the solid electrolyte layer contains a sulfide solid electrolyte material, the sulfide solid electrolyte material comprises a Li element, a P element, a S element, and an I element, and the cathode active material layer contains a specific phosphate ester.

9 Claims, 2 Drawing Sheets

(51) Int. Cl.
  *H01M 4/525* (2010.01)
  *H01M 10/0562* (2010.01)
  *H01M 4/62* (2006.01)
  *H01M 10/056* (2010.01)
  *H01M 10/0567* (2010.01)
  *H01M 4/131* (2010.01)

(52) U.S. Cl.
  CPC ......... *H01M 4/628* (2013.01); *H01M 10/056* (2013.01); *H01M 10/0562* (2013.01); *H01M 10/0567* (2013.01); *H01M 4/131* (2013.01); *H01M 4/62* (2013.01); *H01M 2300/0068* (2013.01)

(58) Field of Classification Search
  CPC .... H01M 10/0562; H01M 4/525; H01M 4/62; H01M 2300/0068; H01M 4/131
  USPC ........................................................ 429/323
  See application file for complete search history.

(56) References Cited

FOREIGN PATENT DOCUMENTS

| | | |
|---|---|---|
| JP | H10-255839 A | 9/1998 |
| JP | 2013-037896 A | 2/2013 |
| JP | 2015-522915 A | 8/2015 |
| JP | 2015-162356 A | 9/2015 |
| WO | 2012/077712 A1 | 6/2012 |
| WO | 2013/180781 A1 | 12/2013 |

OTHER PUBLICATIONS

Laoutid, F., et al, "New prospects in flame retardant polymer materials: From fundamentals to nanocomposites," Materials Science and Engineering R, vol. 63 (3); Jan. 29, 2009, pp. 100-125.

* cited by examiner

SOLID-STATE LITHIUM BATTERY

This application claims priority to Japanese Patent Application No. 2015-247507, filed on Dec. 18, 2015. The entire contents of the prior application are hereby incorporated by reference herein in their entirety.

TECHNICAL FIELD

The disclosure relates to a solid-state lithium battery in which a thermal stability is improved.

BACKGROUND

Along with the rapid distribution of information-related equipment and communication equipment such as personal computers, video cameras, and mobile telephones in recent years, the development of batteries that are utilized as electric power sources thereof has been considered important. Furthermore, the development of high output and high capacity batteries for electric vehicles or hybrid vehicles is in progress in the automobile industry as well. Currently, among various batteries, lithium batteries are attracting attention because of their high energy densities.

With regard to the lithium batteries that are currently available in the market, since liquid electrolytes including flammable organic solvents are used, installation of safety devices that suppress temperature increase at the time of short circuits, and structures for preventing short circuits are needed. Meanwhile, since lithium batteries that have been produced into all solid state batteries by converting the liquid electrolyte to a solid electrolyte layer do not use flammable organic solvents in the batteries, it is contemplated that simplification of safety devices can be promoted, and the lithium batteries are excellent in view of the production cost and productivity.

Among solid electrolyte materials, since a sulfide solid electrolyte material is so high in Li ion conductivity, various kinds of research thereof have been progressed. Also, as a sulfide solid electrolyte material, sulfide solid electrolyte materials containing an iodine element (I element) are known. For example, Patent literature 1 discloses a sulfide solid electrolyte material obtained by using $Li_2S$, $P_2S_5$, LiI, and AS (AS is at least one kind of $Al_2S_3$, $SiS_2$ and $GeS_2$). Patent literature 1 also discloses usage of an oxide active material such as $LiNi_{1/3}CO_{1/3}Mn_{1/3}O_2$ as a cathode active material.

CITATION LIST

Patent Literature

Patent Literature 1: Japanese Patent Application Laid-Open No. 2013-037896

SUMMARY

Technical Problem

If a battery in which an oxide active material is used as a cathode active material and a sulfide solid electrolyte material containing an I element is used as a solid electrolyte material is, for example, exposed to high temperature in a charged state, an exothermic reaction due to the reaction of the oxide active material and the sulfide solid electrolyte material occurs. Therefore, further improvement of a thermal stability is desired.

The disclosed embodiments have been made in view of the above-mentioned circumstances, and the main object thereof is to provide a solid-state lithium battery in which a thermal stability is improved.

Solution to Problem

To solve the above-described problem, a thorough investigation was made and it was found that the exothermic peak temperature is shifted to the high temperature side by adding a specific phosphate ester into the cathode active material layer, so that the thermal stability is improved.

In a first embodiment, there is provided a solid-state lithium battery comprising a cathode active material layer containing a cathode active material, an anode active material layer containing an anode active material, and a solid electrolyte layer formed between the cathode active material layer and the anode active material layer, wherein the cathode active material is an oxide active material, at least one of the cathode active material layer and the solid electrolyte layer contains a sulfide solid electrolyte material, the sulfide solid electrolyte material comprising a Li element, a P element, a S element, and an I element, and the cathode active material layer contains a phosphate ester represented by general formula (1) or general formula (2):

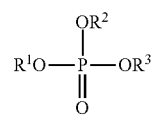

General formula (1)

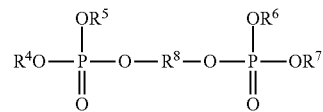

General formula (2)

where, in general formula (1), $R^1$ to $R^3$ are each independently a group containing at least a carbon element, and at least one of $R^1$ to $R^3$ has a $C_6H_5$ group, a $C_6F_5$ group, a $C_6H_4(CH_3)$ group, or a $CF_3$ group at an end edge, and, in the general formula (2), $R^4$ to $R^8$ are each independently a group containing at least a carbon element, and at least one of $R^4$ to $R^7$ has a $C_6H_5$ group, a $C_6F_5$ group, a $C_6H_4(CH_3)$ group, or a $CF_3$ group at an end edge.

According to embodiments, usage of a specific phosphate ester in the cathode active material layer allows a solid-state lithium battery in which a thermal stability is improved.

$R^1$ to $R^3$ in general formula (1) may each independently have the $C_6H_5$ group, the $C_6F_5$ group, the $C_6H_4(CH_3)$ group, or the $CF_3$ group at the end edge, and $R^4$ to $R^8$ in general formula (2) may each independently have the $C_6H_5$ group, the $C_6F_5$ group, the $C_6H_4(CH_3)$ group, or the $CF_3$ group at the end edge.

The phosphate ester may not contain Li.

The phosphate ester may be a liquid at a temperature in the range of −20° C. to 100° C. The phosphate ester may be a liquid at 25° C.

The phosphate ester may be a phosphate ester represented by any one of structural formulae (a) to (d).

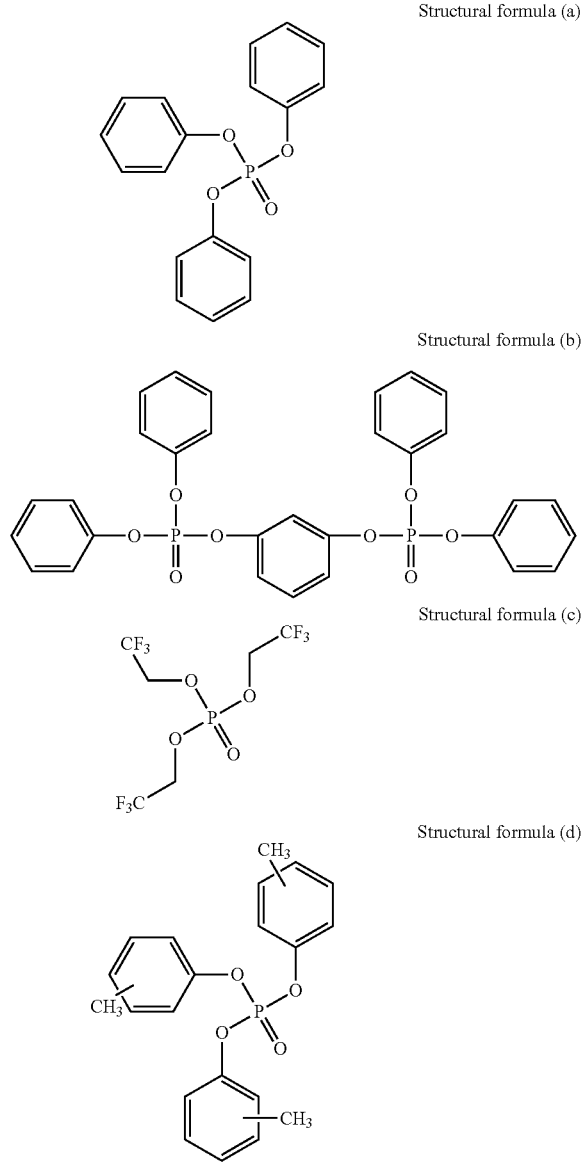

[Chemical formula 2]

Structural formula (a)

Structural formula (b)

Structural formula (c)

Structural formula (d)

The ratio of the phosphate ester in the cathode active material layer may be in the range of 1% to 30% by weight. The ratio of the phosphate ester in the cathode active material layer may be in the range of 3% to 20% by weight. The ratio of the phosphate ester in the cathode active material layer may be in the range of 5% to 10% by weight.

Advantageous Effects

The disclosed embodiments provide for a solid-state lithium battery (a lithium solid battery) in which a thermal stability is improved.

DETAILED DESCRIPTION

Hereinafter, the solid-state lithium battery according to embodiments will be described in detail.

Figure 1:
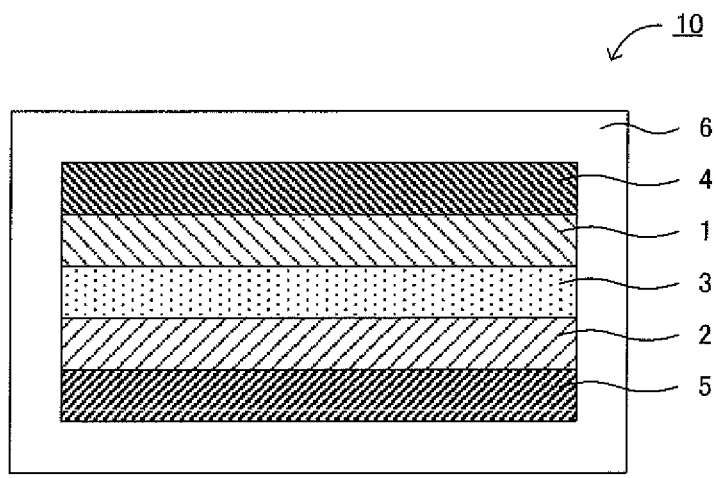
FIG. 1 is a schematic cross-sectional view illustrating an example of a solid-state lithium battery according to an embodiment.

FIG. 1 is a schematic cross-sectional view illustrating an example of a solid-state lithium battery according to an embodiment. A solid-state lithium battery 10 shown in FIG. 1 comprises a cathode active material layer 1, an anode active material layer 2, a solid electrolyte layer 3 that is formed between the cathode active material layer 1 and the anode active material layer 2, a cathode current collector 4 that performs current collection of the cathode active material layer 1, an anode current collector 5 that performs current collection of the anode active material layer 2, and a battery case 6 that accommodates these members. The cathode active material layer 1 contains an oxide active material as a cathode active material. Also, at least one of the cathode active material layer 1 and the solid electrolyte layer 3 contains a sulfide solid electrolyte material. Further, this sulfide solid electrolyte material is usually in contact with the oxide active material contained in the cathode active material layer 1. This sulfide solid electrolyte material comprises a Li element, a P element, a S element and an I element. Particularly, according to embodiments, it is a major characteristic that the cathode active material layer 1 contains a phosphate ester represented by the general formula (1) or the general formula (2).

According to embodiments, usage of a specific phosphate ester in the cathode active material layer allows a solid-state lithium battery in which a thermal stability is improved. As described above, if the battery in which an oxide active material is used as a cathode active material and a sulfide solid electrolyte material containing an I element is used as a solid electrolyte material is, for example, exposed to high temperature in a charged state, an exothermic reaction due to the reaction of the oxide active material and the sulfide solid electrolyte material occurs.

In this exothermic reaction, it is presumed that the following phenomenon occurs. If the battery is exposed to high temperature (for example, 150° C. or more), an I element may be thrown out from the sulfide solid electrolyte material, thereby becoming an $I_2$ gas. Throwing out of the I element may cause destabilization in the structure of the sulfide solid electrolyte material. On the other hand, if the battery is exposed to high temperature, an oxygen radical (O radical) may be generated from the oxide active material. The O radical may react with a sulfur element (S element) of the destabilized sulfide solid electrolyte material, and thereby a substitution reaction may occur. It is presumed that heat is generated by the substitution reaction.

In the disclosed embodiments, usage of the specific phosphate ester allows an exothermic peak temperature to be shifted to the high temperature side. The mechanism is presumed as follows. It is presumed that the phosphate ester acts with the destabilized sulfide solid electrolyte material from which the I element is thrown out, so as to alleviate destabilization of the sulfide solid electrolyte material. If the battery is exposed to high temperature, although the oxygen radical (O radical) may be generated from the oxide active material, at the same time, a radical derived from a $C_6H_5$ group, a $C_6F_5$ group, a $C_6H_4$ ($CH_3$) group, or a $CF_3$ group may be also generated from the phosphate ester. Since this radical immobilizes (traps) the O radical, the substitution reaction of the O radical and the S element may be suppressed. It is presumed that these effects allow an exothermic peak temperature to be shifted to the high temperature side. Incidentally, it is considered the trap reaction does not accompany exotherm.

The constitution of the solid-state lithium battery according to embodiments is hereinafter described.

1. Cathode Active Material Layer

The cathode active material layer according to embodiments is a layer that contains at least a cathode active material. Also, the cathode active material according to embodiments is usually an oxide active material. Further, the cathode active material layer contains a phosphate ester represented by the general formula (1) or the general formula (2).

[Chemical formula 3]

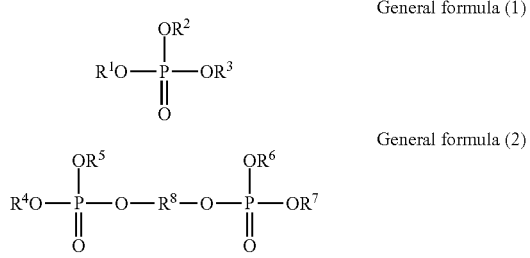

General formula (1)

General formula (2)

In the general formula (1), $R^1$ to $R^3$ are each independently a group containing at least a carbon element. The carbon number of each of $R^1$ to $R^3$ is, for example, in the range of 1 to 10. Furthermore, each of $R^1$ to $R^3$ may be constituted with a carbon element and a hydrogen element only, and may further contain another element. Similarly, each of $R^1$ to $R^3$ may be constituted with a carbon element and a fluorine element only, and may further contain another element. Similarly, each of $R^1$ to $R^3$ may be constituted with a carbon element, a hydrogen element, and a fluorine element only, and may further contain another element. Furthermore, each of $R^1$ to $R^3$ may have a chain structure, may have a cyclic structure (including aromatic structures), and may have both a chain structure and a cyclic structure. The chain structure may be a straight chain structure and may be a branched structure, but the former is preferable. Incidentally, these technical features may be combined arbitrarily.

At least one of $R^1$ to $R^3$ has a $C_6H_5$ group, a $C_6F_5$ group, a $C_6H_4$ ($CH_3$) group, or a $CF_3$ group at an end edge. These groups are referred to as a "specific group". The specific group may be bonded directly to the O element in a $POO_3$ skeleton, and may be bonded thereto through another group. Examples of another group may include a hydrocarbon group. The hydrocarbon group may be a saturated hydrocarbon group and may be an unsaturated hydrocarbon group, but the former is preferable.

In embodiments, one of $R^1$ to $R^3$ may have the specific group at the end edge, but it is preferable that two or three (all) of $R^1$ to $R^3$ each independently have the specific group at the end edge.

In addition, the general formula (1) corresponds to a triphosphate ester, and the general formula (2) corresponds to a condensate of triphosphate esters.

In the general formula (2), $R^4$ to $R^8$ are each independently a group containing at least a carbon element. The carbon number of $R^4$ to $R^8$ is, for example, in the range of 1 to 10. Furthermore, each of $R^4$ to $R^8$ may be constituted with a carbon element and a hydrogen element only, and may further contain another element. Similarly, each of $R^4$ to $R^8$ may be constituted with a carbon element and a fluorine element only, and may further contain another element. Similarly, each of $R^4$ to $R^8$ may be constituted with a carbon element, a hydrogen element, and a fluorine element only, and may further contain another element. Furthermore, each of $R^4$ to $R^8$ may have a chain structure, may have a cyclic structure (including aromatic structures), and may have both a chain structure and a cyclic structure. The chain structure may be a straight chain structure and may be a branched structure, but the former is preferable. Incidentally, these technical features may be combined arbitrarily.

At least one of $R^4$ to $R^7$ has the specific group described above at an end edge. The specific group may be bonded directly to the O element in a $POO_3$ skeleton, and may be bonded thereto through another group. Examples of the other group may include a hydrocarbon group. The hydrocarbon group may be a saturated hydrocarbon group and may be an unsaturated hydrocarbon group, but the former is preferable.

In embodiments, one of $R^4$ to $R^7$ may have the specific group at the end edge, but it is preferable that two, three or four (all) of $R^4$ to $R^7$ each independently have the specific group at the end edge. Incidentally, $R^8$ is a group containing at least a carbon element. Examples of $R^8$ may include a $C_6H_4$ group.

The phosphate ester is preferably a compound not containing Li. Compared with the phosphate ester containing Li (the phosphate ester having a Li ion conductivity), the phosphate ester not containing Li has a high thermal stability. Incidentally, the phosphate ester is usually a material which does not substantially react with the sulfide solid electrolyte material containing an I element at 25° C.

The phosphate ester may be a liquid at 25° C. and may be a solid at 25° C., but the former is preferable. Since the liquid phosphate ester is disposed so as to fill the voids (in particular, the voids inevitably generated) of the cathode active material layer, it is possible to improve the thermal stability of the battery while maintaining the volume energy density. Incidentally, based on the viewpoint of the battery operating temperature, the phosphate ester is preferably a liquid at arbitrary temperature in the range of −20° C. to 100° C., for example, and more preferably a liquid at all temperatures within that range.

The ratio of the phosphate ester in the cathode active material layer is, for example, 1% by weight or more, may be 3% by weight or more, and may be 5% by weight or more. If the ratio of the phosphate ester is too small, there is a possibility that it is impossible to improve the heat stability sufficiently. On the other hand, the ratio of the phosphate ester is, for example, 30% by weight or less, may be 20% by weight or less, and may be 10% by weight or less. If the ratio of the phosphate ester is too large, the ratio of the cathode active material is reduced relatively, and there is a possibility that it is impossible to obtain a sufficient capacity.

(1) Oxide Active Material

The cathode active material layer contains an oxide active material as a cathode active material. The oxide active material is not particularly limited, but preferably contains a Li element, a transition metal element, and an O element. Particularly, the oxide active material preferably contains the Li element, the transition metal element, and the O elemental mainly. The total ratio of the Li element, the transition metal element, and the O element in the all elements constituting the oxide active material is, for example, 50 mol % or more, preferably 70 mol % or more, and more preferably 90 mol % or more. Examples of the transition metal element may include Co, Ni, Mn, V, Ti, Fe, and Si. Among them, the oxide active material preferably contains at least one kind of Co, Ni, and Mn as the transition metal element.

Specific examples of the oxide active material may include a rock salt bed type active material such as $LiCoO_2$, $LiMnO_2$, $LiNiO_2$, $LiVO_2$, and $LiNi_{1/3}CO_{1/3}Mn_{1/3}O_2$, a spinel type active material such as $LiMn_2O_4$, $Li_4Ti_5O_{12}$, and $Li(Ni_{0.5}Mn_{1.5})O_4$, an olivine type active material such as $LiFePO_4$, $LiMnPO_4$, $LiNiPO_4$, and $LiCoPO_4$, a Ramsdellite type active material such as $Li_2Ti_3O_7$, and a solid solution type active material including $Li_2MnO_3$. Also, examples of the shape of the oxide active material may include a particle shape. The average particle diameter ($D_{50}$) of the oxide active material is in a range of 0.1 μm to 50 μm, for example.

In embodiments, the surface of the oxide active material is preferably coated with a coating layer comprising Li ion conductive oxide. The reason therefor is to suppress the reaction between the oxide active material and the sulfide solid electrolyte material. Examples of the Li ion conductive oxide may include $LiNbO_3$, $LiBO_2$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $Li_2MoO_4$, $Li_2WO_4$, and arbitrary composite oxides of these.

The thickness of the coating layer is, for example, in the range of 0.1 nm to 100 nm, and preferably in the range of 1 nm to 20 nm. A coverage factor of the coating layer in the surface of the oxide active material is preferably high, and is 50% or more, for example, and preferably 80% or more. Moreover, the coating layer may cover the entire surface of the cathode active material.

(2) Sulfide Solid Electrolyte Material

The cathode active material layer preferably contains a sulfide solid electrolyte material as a solid electrolyte material. The reason therefor is to improve the Li ion conductivity of the cathode active material layer. Further, the sulfide solid electrolyte material usually contains at least a Li element, a P element, a S element and an I element. That is, the sulfide solid electrolyte material may contain a Li element, a P element, a S element, and an I element only, and may further contain another element. Examples of the other element may include a halogen element such as a F element, a Cl element and a Br element, and a transition metal element.

The sulfide solid electrolyte material preferably comprises an ion conductor containing Li, P, S, and LiI. Further, the ion conductor preferably has an anion structure of ortho-composition ($PS_4^{3-}$ structure) as the main component of an anion. The reason therefor is to allow a sulfide solid electrolyte with high chemical stability. The ratio of the anion structure of the ortho-composition to the total anion structure in the ion conductor is preferably 70 mol % or more, and more preferably 90 mol % or more.

The ratio of the ion conductor in the sulfide solid electrolyte material is, for example, 50 mol % or more, and may be 70 mol % or more. The ratio of LiI in the sulfide solid electrolyte material is, for example, 5 mol % or more, and may be 10 mol % or more. The ratio of the LiI thereto is, for example, 50 mol % or less, and may be 40 mol % or less.

Also, the sulfide solid electrolyte material may comprise the ion conductor and LiI only, and may further comprise other components. Examples of the other component may include a lithium halide such as LiF, LiCl, and LiBr. Incidentally, LiI is preferably present in a state of being incorporated into the structure of the ion conductor as a LiI component. Similarly, LiF, LiCl and LiBr are also preferably present in a state of being incorporated into the structure of the ion conductor as a LiF component, a LiCl component, and a LiBr component respectively. In other words, the sulfide solid electrolyte material preferably contains the lithium halide in a physically inseparable state, not in a simple mixed state.

The sulfide solid electrolyte material may be a crystalline material, and may be an amorphous material. Further, the sulfide solid electrolyte material may be a glass, and may be a crystallized glass (a glass ceramics). Examples of the shape of the sulfide solid electrolyte material may include a particle shape. Also, the average particle size ($D_{50}$) of the sulfide solid electrolyte material is in the range of 0.01 um to 40 pm, for example. Further, the Li-ion conductivity of the sulfide solid electrolyte material at 25° C. is preferably $1 \times 10^{-4}$ S/cm or more, and more preferably $1 \times 10^{-3}$ S/cm or more.

(3) Cathode Active Material Layer

The cathode active material layer contains at least an oxide active material and a phosphate ester, and may further contain at least one of a conductive material and a binder as necessary. Examples of the conductive material may include a carbon material such as acetylene black, Ketjen Black, and carbon fiber, and a metal material. Also, examples of the binder may include a fluorine-containing binder such as PTFE and PVdF.

The porosity of the cathode active material layer not containing the phosphate ester is preferably 20% by volume or less for example, and more preferably 15% by volume or less. On the other hand, the porosity of the cathode active material layer not containing the phosphate ester may be 1% by volume or more for example, and may be 5% by volume or more. Further, the porosity of the cathode active material layer containing the phosphate ester is preferably lower, and is preferably 10% by volume or less for example, and more preferably 5% by volume or less. In addition, the thickness of the cathode active material layer is in the range of 0.1 pm to 1000 pm, for example.

The method of forming the cathode active material layer is not particularly limited, and suitably selected in accordance with the nature of the phosphate ester. If the phosphate ester is a liquid, examples of the method may include a method of pressing a powder of a cathode mixture to form a pellet, and then adding the phosphate ester to the pellet. On the other hand, if the phosphate ester is a solid, examples of the method may include a method of mixing the phosphate ester with a powder of a cathode mixture, and then pressing the mixture. Incidentally, the phosphate ester may be added to a slurry of a cathode mixture.

2. Solid Electrolyte Layer

The solid electrolyte layer according to embodiments is a layer that is formed between the cathode active material layer and the anode active material layer. Also, the solid electrolyte layer is a layer that contains at least a solid electrolyte material, and may further contain a binder as necessary.

The solid electrolyte material and the binder which can be used in the solid electrolyte layer are the same as those in the above described cathode active material layer. Particularly, the solid electrolyte material to be used in the solid electrolyte layer is preferably the sulfide solid electrolyte material. Also, the content of the solid electrolyte material in the solid electrolyte layer is in a range of 10% by weight to 100% by weight for example, and preferably in a range of 50% by weight to 100% by weight.

If the phosphate ester to be added to the cathode active material layer is a liquid, the solid electrolyte layer is preferably a layer which does not allow the phosphate ester to pass therethrough. If the phosphate ester penetrates to the anode active material layer, reductive decomposition of the phosphate ester may occur. Whether the solid electrolyte layer allows the phosphate ester to pass therethrough or not can be confirmed by evaluating a phosphate ester dropped on the upper side surface of the solid electrolyte layer if the phosphate ester penetrates to the lower side surface. The solid electrolyte layer is preferably a layer that has a density not allowing the phosphate ester to pass therethrough.

Also, the thickness of the solid electrolyte layer is in a range of 0.1 pm to 1000 μm, for example.

3. Anode Active Material Layer

The anode active material layer according to embodiments is a layer that contains at least an anode active material, and may further contain at least one of a solid electrolyte material, a conductive material, and a binder, as necessary.

Examples of the anode active material may include a metal active material, and a carbon active material. Examples of the metal active material may include a Li alloy, In, Al, Si, and Sn. On the other hand, examples of the carbon active material may include graphite such as mesocarbon microbeads (MCMB) and high orientation pyrolytic graphite (HOPG), and amorphous carbon such as hard carbon and soft carbon. Incidentally, a substance such as SiC may be used as the anode active material.

The solid electrolyte material, the conductive material, and the binder which can be used in the anode active material layer are the same as those in the above described cathode active material layer. Also, the thickness of the anode active material layer varies greatly depending on the constitution of a battery, and is in a range of 0.1 μm to 1000 μm, for example.

4. Other Constitutions

The solid-state lithium battery according to embodiments comprises the above described cathode active material layer, anode active material layer, and solid electrolyte layer. Further, the solid-state lithium battery usually comprises a cathode current collector that performs current collection of the cathode active material layer, and an anode current collector that performs current collection of the anode active material layer. Examples of a material for the cathode current collector may include SUS, aluminum, nickel, iron, titanium, and carbon. On the other hand, examples of a material for the anode current collector may include SUS, copper, nickel, and carbon. Furthermore, a battery case of a typical battery may be used as the battery case, and examples thereof may include a SUS battery case.

5. Solid-State Lithium Battery

The solid-state lithium battery according to embodiments may be a primary battery or a secondary battery. In particular, a secondary battery is preferable, since the secondary battery can be repeatedly charged and discharged and is useful as a battery mounted on an automobile, for example. Examples of the shape of the solid-state lithium battery according to embodiments may include a coin shape, a laminate shape, a cylindrical shape, and a rectangular shape.

The disclosure is not intended to be limited to the disclosed embodiments. The disclosed embodiments are only for illustrative purposes, and any embodiment having substantially the same constitution as the embodiments described herein and providing similar operating effects, is contemplated and should be considered to be included in the technical scope of this disclosure.

EXAMPLES

Hereinafter, the disclosed embodiments will be described more specifically by way of Examples.

Example 1

(Synthesis of Sulfide Solid Electrolyte Material)

As starting raw materials, lithium sulfide ($Li_2S$, manufactured by Nippon Chemical Industrial Co., LTD.), lithium iodide (LiI, manufactured by Nippon Chemical Industrial Co., LTD.), and diphosphorus pentasulfide ($P_2S_5$, manufactured by Sigma-Aldrich Co. LLC.) were used. These powders were mixed in a glove box under an Ar atmosphere in a ratio that $Li_2S$ was 0.7656 g, LiI was 0.743 g, and $P_2S_5$ was 1.2344 g to obtain a raw material composition. Next, the raw material composition was mixed for 5 minutes in an agate mortar, and then put into a zirconia pot along with 4 g of dehydration heptane. This pot was mounted on a planetary ball milling machine, and mechanical milling was performed in 370 rpm of the table rotation speed for 40 hours. As a result, a sulfide solid electrolyte material ($20LiI$-$80Li_3PS_4$, sulfide glass) was obtained.

(Manufacturing of Evaluation Battery)

Lithium Nickel-Cobalt-Manganese Oxide ($LiNi_{1/3}CO_{1/3}Mn_{1/3}O_2$) was used as a cathode active material. The coating layer of $LiNbO_3$ was formed on the surface of this cathode active material. Mixed were 100 mg of this cathode active material, 1.5 mg of VGCF (manufactured by Showa Denko K.K.) as a conductive material, 2 mg of PVdF as a binder, and 32 mg of the sulfide glass. The obtained mixture was weighed so as to be 16 mg, and pressed at a pressure of 1 ton/$cm^2$ to obtain a molded mixture. The weight of 2.4 mg of a phosphate ester (triphenyl phosphate) in a liquid state was penetrated to the obtained molded mixture to obtain a cathode mixture (pellet). Then, 100 mg of a graphite (manufactured by Mitsubishi Chemical Co., LTD.) as an anode active material, 2.5 mg of PVdF as a binder, and 67 mg of the sulfide glass were mixed to obtain an anode mixture.

Thereafter, 18 mg of the sulfide glass was put into the ceramic mold of 1 $cm^2$, and pressed at a pressure of 4 ton/$cm^2$ to form a solid electrolyte layer. Next, the cathode mixture (18.4 mg) was placed on one surface of the solid electrolyte layer, 17.3 mg of the anode mixture was added on the other surface of the solid electrolyte layer, and pressed at a pressure of 4 ton/$cm^2$ to form an anode active material layer. Then, aluminum foil was used as a cathode current collector, and copper foil was used as an anode current collector to obtain an evaluation battery.

Examples 2 to 4

Evaluation batteries were obtained in the same manner as in Example 1 except for using phosphate esters represented by the structural formulae (b) to (d) instead of the phosphate ester represented by the structural formula (a) (triphenyl phosphate), and changing an amount of the phosphate ester to the amount shown in Table 1.

[Chemical formula 4]

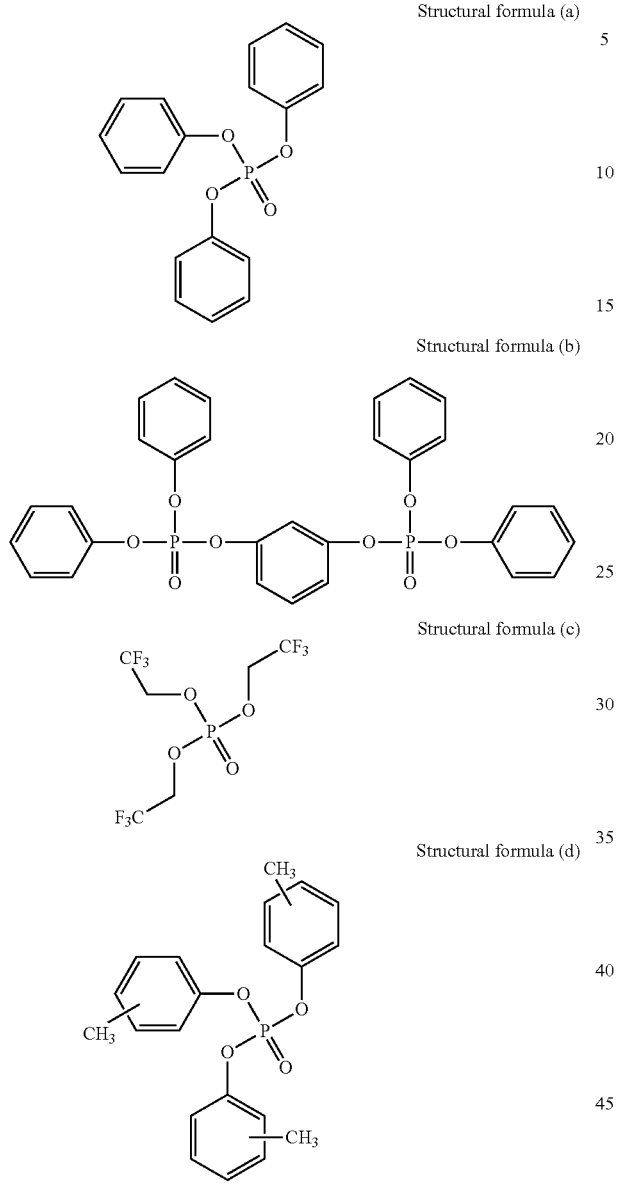

Comparative Example 1

An evaluation battery was obtained in the same manner as in Example 1 except for not using a phosphate ester.

Comparative Examples 2 to 6

Evaluation batteries were obtained in the same manner as in Example 1 except for using phosphate esters represented by the structural formulae (e) to (i) instead of the phosphate ester represented by the structural formula (a) (triphenyl phosphate), and changing an amount of the phosphate ester to the amount shown in Table 1.

[Chemical formula 5]

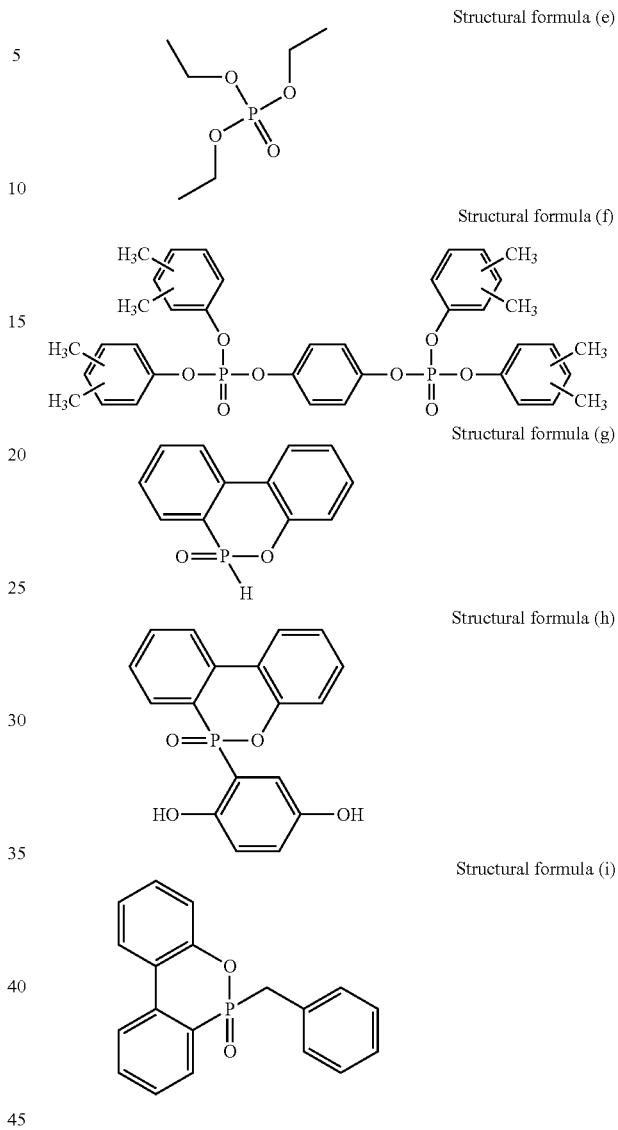

Comparative Examples 7 to 33

Evaluation batteries were obtained in the same manner as in Example 1 except for using compounds shown in Table 1 instead of the phosphate ester represented by the structural formula (a) (triphenyl phosphate), and changing an amount of the each compound to the amount shown in Table 1. Incidentally, in Examples of the disclosed embodiments and Comparative Examples, a liquid compound was used as the additive material, the compound was penetrated to the molded mixture to obtain the cathode mixture in the same manner as in Example 1. On the other hand, if a solid compound was used as the additive material, the compound was mixed to a mixture before molding.

Example 5

As starting raw materials, lithium sulfide ($Li_2S$, manufactured by Nippon Chemical industrial Co., LTD.), lithium iodide (LiI, manufactured by Nippon Chemical Industrial Co., LTD.), LiBr (manufactured by Japan Pure Chemical Co., LTD.), and diphosphorus pentasulfide ($P_2S_5$, manufactured by Sigma-Aldrich Co. LLC.) were used. These powders were mixed in a glove box under an Ar atmosphere in a ratio that $Li_2S$ was 0.7178 g, LiI was 0.3715 g, LiBr was 0.5573 g, and $P_2S_5$ was 1.1573 g to obtain a raw material composition. Next, the raw material composition was mixed for 5 minutes in an agate mortar, then it was put into a zirconia pot along with 4 g of dehydration heptane. The pot was mounted on a planetary ball milling machine, and mechanical milling was performed in 370 rpm of the table rotation speed for 40 hours. As a result, a sulfide solid electrolyte material (10LiI-15LiBr-75$Li_3PS_4$, sulfide glass) was obtained. An evaluation battery was obtained in the same manner as in Example 3 except for using the obtained sulfide solid electrolyte material.

Comparative Example 34

An evaluation battery was obtained in the same manner as in Example 5 except for not using a phosphate ester.

turing the cathode active material layer in the charged state is as follows. First, the obtained evaluation battery was restrained by restraining jig, placed inside the container which is connected to a terminal, and sealed. The sealed container was placed in to a thermostat at a temperature of 25° C. Confirming the temperature of the evaluation battery being 25° C., the charge and discharge was started (constant current: 1/20 C, termination current: 1/100 C, charge voltage: 4.37 V, discharge voltage: 3.0 V). After the charge and discharge was completed, only charge was conducted again. Confirming that the battery voltage became 4.37 V by the charging, the evaluation battery was disassembled carefully not to cause a short circuit. Specifically, the cathode active material layer of the evaluation battery which is taken out from the sealed container was peeled off by a boundary of the solid electrolyte layer. As a result, a cathode active material layer in a charged state was obtained.

Next, 5 mg of the cathode active material layer in the charged state was added to a stainless steel container for

TABLE 1

|  | Additive material | Classification | Additive amount (wt %) |
| --- | --- | --- | --- |
| Comp. Example 1 | — | — | — |
| Example 1 | $(PhO)_3PO$ | Phosphate ester | 15 |
| Example 2 | $(PhO)_2PO—OPhO—PO(OPh)_2$ |  | 15 |
| Example 3 | $(CF_3CH_2O)_3PO$ |  | 5 |
| Example 4 | $(CH_3PhO)_3PO$ |  | 15 |
| Comp. Example 2 | $(CH_3CH_2O)_3PO$ | Phosphate ester | 15 |
| Comp. Example 3 | $((CH_3)_2PhO)_2PO—OPhO—PO(OPh(CH_3)_2)_2$ |  | 15 |
| Comp. Example 4 | 9,10-Dihydro-9-oxa-10-phosphaphenanthrene-10-oxide |  | 15 |
| Comp. Example 5 | 10-(2,5-Dihydroxphenyl)-9,10-dihydro-9-oxa-10-phosphaphenanthrene-10-oxide |  | 15 |
| Comp. Example 6 | 9,10-Dihydro-10-benzyl-9-oxa-10-phosphaphenanthrene-10-oxide |  | 15 |
| Comp. Example 7 | Naphthalene | Aromatic | 30 |
| Comp. Example 8 | Anthracene | hydrocarbon | 30 |
| Comp. Example 9 | Decabromodiphenylether | Bromine compound | 30 |
| Comp. Example 10 | Pentabromotoluene |  | 30 |
| Comp. Example 11 | Tetrabromo phthalic anhydride |  | 30 |
| Comp. Example 12 | 2,4,6-tribromophenol |  | 30 |
| Comp. Example 13 | Tetrabromobisphenol A |  | 30 |
| Comp. Example 14 | 2,4,6-Tris (2,4,6-tribromophenoxy)-1,3,5-triazine |  | 30 |
| Comp. Example 15 | Tris (2,3-dibromopropyl)isocyanurate |  | 30 |
| Comp. Example 16 | 2,4,6-Triphenyl-1,3,5-triazine | Phenyl group- | 30 |
| Comp. Example 17 | 2,4,6-Triphenoxy-1,3,5-triazine | containing | 30 |
| Comp. Example 18 | N,N',N''-Triphenyl-1,3,5-triazine-2,4,6-triamine | triazine compound | 30 |
| Comp. Example 19 | 2,4,6-Tris(trifluoromethyl)-1,3,5-triazine | Fluorinated triazine | 30 |
| Comp. Example 20 | 2,4,6-Tris(pentadecafluoroheptyl)-1,3,5-triazine | compound | 30 |
| Comp. Example 21 | $C_2F_5CF(OCH_3)C_3F_7$ | Fluorinated ether | 30 |
| Comp. Example 22 | $P_3N_3(PhO)_6$ | Phosphazene compound | 30 |
| Comp. Example 23 | $P_3N_3F_5(OCH_2CH_3)$ | Fluorinated | 15 |
| Comp. Example 24 | $P_3N_3F_5(OPh)$ | phosphazene compound | 15 |
| Comp. Example 25 | N,N'-diphenyl-p-phenylenediamine | Aromatic amine | 5 |
| Comp. Example 26 | Aluminum hydroxide | hydroxide | 30 |
| Comp. Example 27 | Magnesium hydroxide |  | 30 |
| Comp. Example 28 | Zinc hydroxide |  | 30 |
| Comp. Example 29 | Antimony oxide(III) | Oxide | 30 |
| Comp. Example 30 | Molybdenum oxide(VI) |  | 30 |
| Comp. Example 31 | Sodium Tetraborate (Decahydrate) | Borate | 30 |
| Comp. Example 32 | Manganese carbonate(II) | Carbonate | 30 |
| Comp. Example 33 | Red phosphorus | Phosphorus | 30 |
| Comp. Example 34 | — | — | — |
| Example 5 | $(CF_3CH_2O)_3PO$ | Phosphate ester | 15 |

[Evaluation]
(DSC Measurement)
Using evaluation batteries obtained in Examples 1 to 5 and Comparative Examples 1 to 34, cathode active material layers in a charged state (charged electrodes) were prepared to measure an exothermic behavior. A method of manufac- DSC (Differential Scanning calorimeter), and the container was sealed. The sealed container was set in a DSC apparatus (manufactured by Hitachi High-Tech Science Co., LTD.), and the measurement was conducted. The used reference was 5 mg of $Al_2O_3$, with the temperature rising speed of 5° C./min, and the end temperature of 500° C. From the results of DSC, a heat generation starting temperature, an exothermic peak temperature, and an accumulated calorific value were determined. Incidentally, the heat generation starting temperature is referred to the temperature at which the Heat Flow rises, and the exothermic peak temperature is referred to the peak temperature of the lowest temperature side in the Heat Flow (temperature of the first exothermic peak). Further, the accumulated calorific value was determined by integrating the calorific values from the start of measurement up to 250° C.

Figure 2:
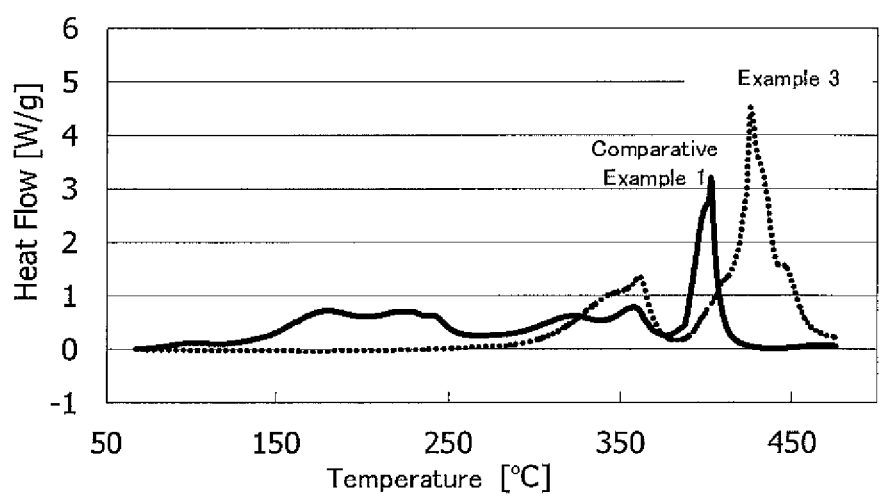
FIG. 2 is a result of DSC measurement with respect to charged electrodes manufactured in Example 3 and Comparative Example 1.

As representative examples of the obtained DSC profile, the results of Example 3 and Comparative Example 1 are shown in FIG. 2. As shown in FIG. 2, in Comparative Example 1, the exothermic reaction started at about 100° C., and then exothermic reaction was further preceded by its own heat (self-heating). Thus, it was confirmed that the exothermic reaction occurs if the battery in a charged state was exposed to high temperature. In contrast, in Example 3, the exothermic reaction did not start until about 300° C. That is, the heat generation starting temperature was shifted about 200° C. to high temperature side. Therefore, it was confirmed that the thermal stability was improved by adding the phosphate ester. Further, the exothermic peak temperature in Comparative Example 1 and Example 3 were 188° C. and 358° C. respectively.

Also, the results of Examples 1 to 5 and Comparative Examples 1 to 34 are shown in Table 2. Incidentally, the evaluation of the exothermic peak temperature was referred to "S" if it was 1.6 times or more, "A" if it was 1.4 times or more and less than 1.6 times, "3" if it was 1.2 times or more and less than 1.4 times, and "C" if it was less than 1.2 times, all compared with the result of Comparative Example 1. The evaluation of the accumulated calorific value was referred to "3" if it was 20% or less, "A" if it was greater than 20% and 50% or less, "B" if it was greater than 50% and 80% or less, and "C" if it was greater than 80%, all compared with the result of Comparative Example 1.

TABLE 2

| | Classification | Additive amount (wt %) | Exothermic peak temperature (° C.) | Evaluation | Accumulated calorific value up to 250° C. (J/g) | Evaluation |
|---|---|---|---|---|---|---|
| Comp. Example 1 | — | — | 188 | C | 533 | C |
| Example 1 | Phosphate ester | 15 | 327 | S | 0 | S |
| Example 2 | | 15 | 310 | S | 105 | S |
| Example 3 | | 5 | 358 | S | 0 | S |
| Example 4 | | 15 | 280 | A | 71 | S |
| Comp. Example 2 | Phosphate ester | 15 | 230 | B | 462 | C |
| Comp. Example 3 | | 15 | 97 | C | 459 | C |
| Comp. Example 4 | | 15 | 81 | C | 663 | C |
| Comp. Example 5 | | 15 | 198 | C | 531 | C |
| Comp. Example 6 | | 15 | 105 | C | 485 | C |
| Comp. Example 7 | Aromatic | 30 | 176 | C | 659 | C |
| Comp. Example 8 | hydrocarbon | 30 | 170 | C | 923 | C |
| Comp. Example 9 | Bromine compound | 30 | 233 | B | 506 | C |
| Comp. Example 10 | | 30 | 232 | B | 486 | C |
| Comp. Example 11 | | 30 | 160 | C | 595 | C |
| Comp. Example 12 | | 30 | 100 | C | 837 | C |
| Comp. Example 13 | | 30 | 169 | C | 686 | C |
| Comp. Example 14 | | 30 | 194 | C | 488 | C |
| Comp. Example 15 | | 30 | 120 | C | 829 | C |
| Comp. Example 16 | Phenyl group- | 30 | 187 | C | 284 | B |
| Comp. Example 17 | containing | 30 | 180 | C | 382 | B |
| Comp. Example 18 | triazine compound | 30 | 181 | C | 607 | C |
| Comp. Example 19 | Fluorinated triazine | 30 | 153 | C | 545 | C |
| Comp. Example 20 | compound | 30 | 181 | C | 277 | B |
| Comp. Example 21 | Fluorinated ether | 30 | 165 | C | 527 | C |
| Comp. Example 22 | Phosphazene compound | 30 | 122 | C | 505 | C |
| Comp. Example 23 | Fluorinated | 15 | 179 | C | 651 | C |
| Comp. Example 24 | phosphazene compound | 15 | 152 | C | 350 | B |
| Comp. Example 25 | Aromatic amine | 5 | 123 | C | 557 | C |
| Comp. Example 26 | hydroxide | 30 | 233 | B | 521 | C |
| Comp. Example 27 | | 30 | 159 | C | 585 | C |
| Comp. Example 28 | | 30 | 166 | C | 686 | C |
| Comp. Example 29 | Oxide | 30 | 187 | C | 514 | C |
| Comp. Example 30 | | 30 | 191 | C | 473 | C |
| Comp. Example 31 | Borate | 30 | 71 | C | 456 | C |
| Comp. Example 32 | Carbonate | 30 | 156 | C | 514 | C |
| Comp. Example 33 | Phosphorus | 30 | 218 | C | 586 | C |
| Comp. Example 34 | — | — | 90 | C | 631 | C |
| Example 5 | Phosphate ester | 15 | 330 | S | 0 | S |

As shown in Table 2, Examples 1 to 4 showed high exothermic peak temperature and low accumulated calorific value compared with Comparative Example 1. On the other hand, Comparative Examples 2 to 6 showed the exothermic peak temperature and the accumulated calorific value in the same level as Comparative Example 1, or worse than Comparative Example 1, while a phosphate ester was not used. Therefore, it was confirmed that the phosphate ester having a specific structure contributed to the improvement of the thermal stability.

Specifically, comparing Example 1 (structural formula (a)), Example 2 (structural formula (b)) and Example 3 (structural formula (c)) with Comparative Example 2 (structural formula (e)), the thermal stability was considered to improve since the phosphate esters in Examples 1 to 3 have a $C_6H_5$ group or a $CF_3$ group at the end edge. Incidentally, since the phosphate ester having a $CF_3$ group at the end edge improved the thermal stability, it was presumed that a phosphate ester having a $C_6F_5$ group, which contains a C—F bond, at the end edge may also improve the thermal stability.

Comparing Example 2 (structural formula (b)) with Comparative Example 3 (structural formula (f)), the thermal stability was not considered to improve since the phosphate ester in Comparative Example 3 had a $C_6H_3(CH_3)_2$ group at the end edge. More specifically, it was considered that substituting two hydrogens of a phenyl group for $CH_3$ groups may not contribute to the improvement of the thermal stability. On the other hand, in Example 4 (structural formula (d)), the thermal stability was improved if one hydrogen of the phenyl group was substituted for a $CH_3$ group. That is, it was confirmed that the phosphate ester having a $C_6H_4(CH_3)$ group at the end edge may contribute to the improvement of the thermal stability. In Comparative Examples 4 to 6, it was suggested that the phosphate ester not having a $POO_3$ skeleton may not be contributed to the improvement of the thermal stability.

Also, in Comparative Examples 7 to 33, although various compounds were used instead of the phosphate esters, the desired effect was not obtained. Specifically, as in Comparative Examples 7 to 15, even if aromatic hydrocarbons and bromine compounds were used, they did not show the improvement of the thermal stability. Further, as in Comparative Examples 16 to 18, even if compounds had a $C_6H_5$ group at the end edge, the triazine compounds did not show the improvement of the thermal stability. Further, as in Comparative Examples 19 to 21, even if fluorinated triazine compounds and a fluorinated ether were used, they did not show the improvement of the thermal stability. Further, as in Comparative Examples 22 to 24, phosphazene compounds did not show the improvement of the thermal stability. Further, as in Comparative Example 25, the aromatic amine did not show the improvement of the thermal stability. Furthermore, although it was presumed that inorganic materials such as in those used Comparative Examples 26 to 30 suppress the exothermic reaction by means of by-product water; such effect was not obtained in fact.

Also, Example 5 showed high exothermic peak temperature and low accumulated calorific value compared with Comparative Example 34. Thus, it was confirmed that the same effect was obtained even if the sulfide solid electrolyte material further contained a halogen element other than iodine.

(Charge-Discharge Test)

Figure 3:
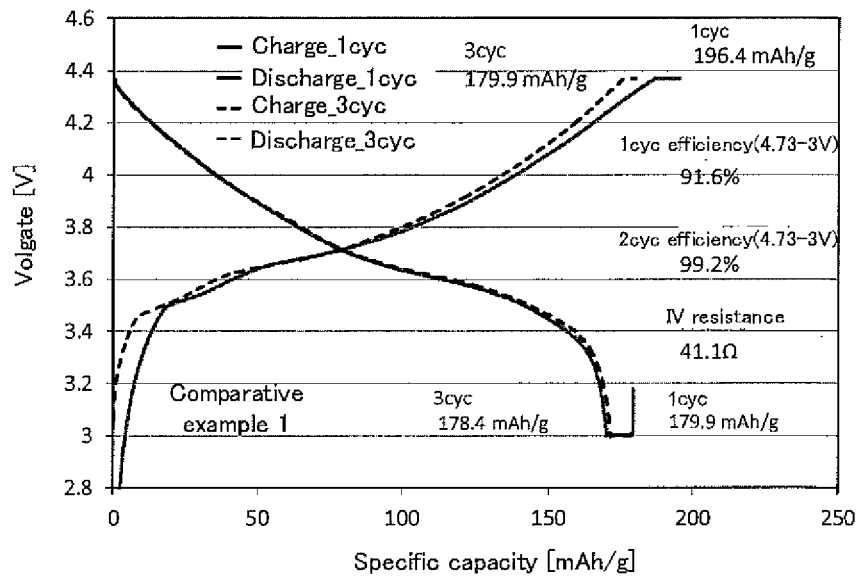
FIG. 3 is a result of charging and discharging measurement with respect to an evaluation battery obtained in Comparative Example 1.
Figure 4:
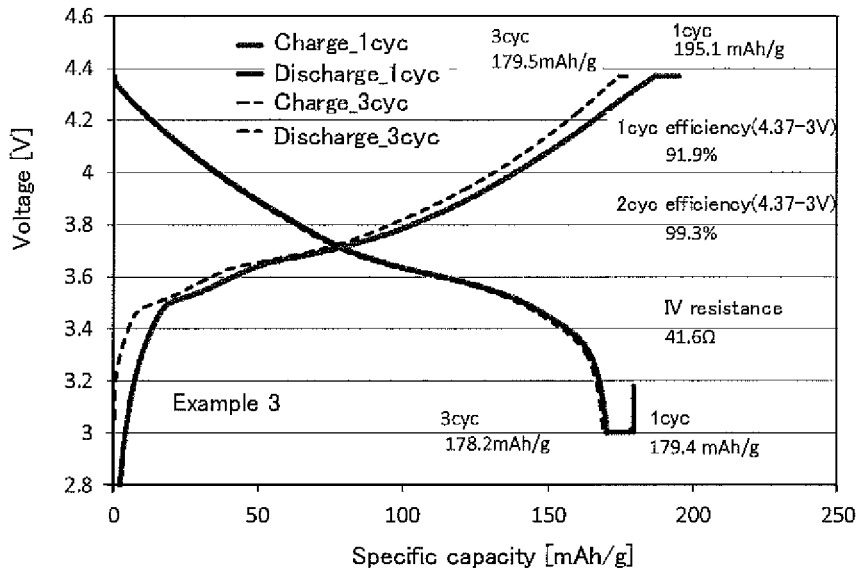
FIG. 4 is a result of charging and discharging measurement with respect to an evaluation battery obtained in Example 3.

Charge-discharge tests were conducted for the evaluation batteries obtained in Examples 1 to 5 and Comparative Examples 1 to 34. Specifically, the charge and discharge was conducted in the same manner as in the DSC measurement described above (constant current: 1/20 C, termination current: 1/100 C, charge voltage: 4.37 V, discharge voltage: 3.0V). As representative examples of the obtained charge-discharge curve, the results of Example 3 and Comparative Example 1 were shown in FIG. 3 and FIG. 4. As shown in FIG. 3 and FIG. 4, in Example 3, the phosphate ester was added, but it showed almost the same battery performance as Comparative Example 1. Specifically, in Example 3 and Comparative Example 1, capacity, coulombic efficiency, and resistance were almost same. In contrast, as shown in Table 2, the exothermic peak temperature in Example 3 was 170° C. higher than that in Comparative Example 1. Similarly, in Example 3, the accumulated calorific value was zero and significantly less than that in Comparative Example 1. In these manners, the thermal stability was improved by adding a specific phosphate ester while maintaining the battery performance.

The invention claimed is:

1. A solid-state lithium battery comprising:

a cathode active material layer containing a cathode active material;

an anode active material layer containing an anode active material; and a solid electrolyte layer formed between the cathode active material layer and the anode active material layer, wherein the cathode active material is an oxide active material, at least one of the cathode active material layer and the solid electrolyte layer contains a sulfide solid electrolyte material, the sulfide solid electrolyte material comprising a Li element, a P element, a S element, and an I element, and the cathode active material layer contains a phosphate ester represented by general formula (1) or general formula (2):

General formula (1)

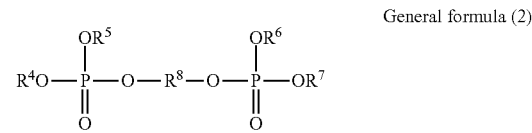

General formula (2)

where, in general formula (1), $R^1$ to $R^3$ are each independently a group containing at least a carbon element, and at least one of $R^1$ to $R^3$ has a $C_6H_5$ group, a $C_6F_5$ group, a $C_6H_4(CH_3)$ group, or a $CF_3$ group at an end edge, and, in general formula (2), $R^4$ to $R^8$ are each independently a group containing at least a carbon element, and at least one of $R^4$ to $R^7$ has a $C_6H_5$ group, a $C_6F_5$ group, a $C_6H_4$ ($CH_3$) group, or a $CF_3$ group at an end edge.

2. The solid-state lithium battery according to claim 1, wherein of $R^1$ to $R^3$ in general formula (1) each independently has the $C_6H_5$ group, the $C_6F_5$ group, the $C_6H_4(CH_3)$ group, or the $CF_3$ group at the end edge, and $R^4$ to $R^8$ in general formula (2) each independently has the $C_6H_5$ group, the $C_6F_5$ group, the $C_5H_4$ ($CH_3$) group, or the $CF_3$ group at the end edge.

3. The solid-state lithium battery according to claim 1, wherein the phosphate ester does not contain Li.

4. The solid-state lithium battery according to claim 1, wherein the phosphate ester is a liquid at 25° C.

5. The solid-state lithium battery according to claim 1, wherein the phosphate ester is a phosphate ester represented by any one of structural formulae (a) to (d):

Structural formula (a)

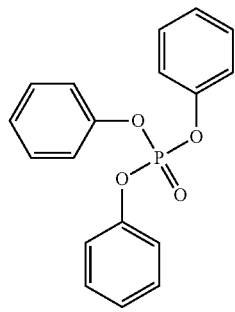

Structural formula (b)

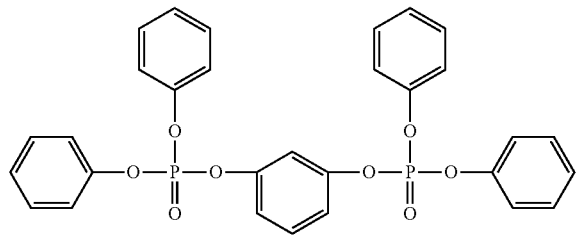

Structural formula (c)

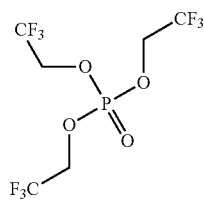

Structural formula (d)

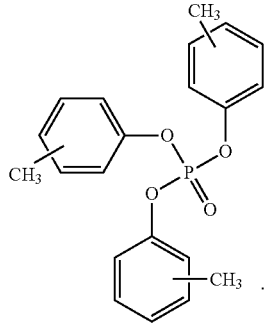

6. The solid-state lithium battery according to claim 1, wherein the phosphate ester is a liquid at a temperature in the range of −20° C. to 100° C.

7. The solid-state lithium battery according to claim 1, wherein the ratio of the phosphate ester in the cathode active material layer is in the range of 1% to 30% by weight.

8. The solid-state lithium battery according to claim 1, wherein the ratio of the phosphate ester in the cathode active material layer is in the range of 3% to 20% by weight.

9. The solid-state lithium battery according to claim 1, wherein the ratio of the phosphate ester in the cathode active material layer is in the range of 5% to 10% by weight.

* * * * *